United States Patent [19]
Ericson

[11] 4,213,075
[45] Jul. 15, 1980

[54] SAFETY CIRCUIT FOR ELECTRICAL LOADS

[76] Inventor: William A. Ericson, Rte. 8, Sturgeon, Wis. 54235

[21] Appl. No.: 927,643

[22] Filed: Jul. 24, 1978

[51] Int. Cl.² .................. H05B 39/10; B60Q 1/04
[52] U.S. Cl. ........................... 315/83; 307/39; 315/93; 315/136; 340/642
[58] Field of Search ............ 315/82, 83, 88, 93, 315/129, 135, 136; 307/10 LS, 39; 340/46, 642

[56] References Cited
U.S. PATENT DOCUMENTS

| | | | |
|---|---|---|---|
| 2,100,695 | 11/1937 | Lackey | 315/93 X |
| 3,535,585 | 10/1970 | Barnum | 315/83 |
| 3,671,955 | 6/1972 | Malekzadeh | 315/83 X |
| 3,733,515 | 5/1973 | Parkes | 315/83 |

*Primary Examiner*—Eugene R. LaRoche
*Attorney, Agent, or Firm*—Robert B. Watkins

[57] ABSTRACT

A safety circuit is provided for parallel connected electrical loads. The headlight circuit of an automobile or other vehicle is an important application for the circuit. In the circuit a reversely polled control rectifier is in a parallel conductor subcircuit to the bright lamp filament of the headlight. The gate of the control rectifier is connected to a conductor of the dim lamp filament of the headlight. The control rectifier presents an open circuit when both of the lamps are operable but is adapted to connect the bright lamp filament through a resistor and a diode when the dim lamp filament of the headlight fails.

3 Claims, 2 Drawing Figures

SAFETY CIRCUIT FOR ELECTRICAL LOADS

BACKGROUND OF THE INVENTION

This invention relates to parallel connected electrical load circuits and particularly automobile head light circuits. It provides a needed means for preventing failure of one light by the substitution of another energized lamp filament. Also included is an indication to the operator that the substitution has taken place and the original lamp is out.

The automobile operating at night with only one lighted head light is a common problem and safety hazard on the highway. In many instances the operator is unaware when one of the headlights on the vehicle goes out because of a filament failure. As the vehicle approaches an oncoming vehicle or pedestrian, the occupants of the other vehicle or the pedestrian, find it difficult to identify the shape or size of the oncoming vehicle, and are sometimes led to an incorrect decision in avoiding the oncoming vehicle with the headlight out. The danger in this situation is well recognized by the fact that in many jurisdictions it is a violation of the law to operate a vehicle with only one headlight operating.

Most over-the-road vehicles, such as automobiles are provided with more than one headlight. Usually each headlight is provided with two lamps, or two separately energized filaments. Usually one filament is constructed to burn relatively brightly and the other relatively dimly, with respect to each other.

Switches are provided to energize either the bright filament or the dim filament separately. In some instances a switch is provided to energize both simultaneously, although this is uncommon.

Usually the operator switches on the dim filament when operating the vehicle in the city environment and as the standard operating position for night time driving. On those occasions of country and freeway night driving, when other oncoming vehicles are not expected to be encountered and when driving at higher speeds, the operator switches over from the normal dim filament to the bright filament. Some vehicles provide a foot switch and some provide a manual switch to make the change. In the event of an oncoming car or other circumstances where the bright beam headlight may blind or glare in the face of others affecting their driving and activities, the legally required practice is to switch the bright beam off and return to the dim filament energized position.

In the past, various approaches have been disclosed to automatically energize a second or emergency lamp when the first or primary lamp fails. This problem has been addressed both from the circumstance of the vehicle with one headlight out, and from the general emergency situation where a primary electric load or light source fails and the emergency light source needs to be activated. Typical patents addressing the problem include U.S. Pat. Nos. 3,535,585—E. A. Barnum, 3,148,016—Fisher, U.S. Pat. No. 3,573,541—Dunn, et al., U.S. Pat. No. 3,659,179—Barker, et al., and U.S. Pat. No. 3,883,777—Morita.

SUMMARY OF THE INVENTION

In this invention a relatively simple circuit is provided using a reversely polled control rectifier, commonly called a silicon controlled rectifier. It is positioned in a parallel subcircuit to the primary conductor for the bright filament lamp of the headlight of a vehicle which has dual lamp filaments connected in parallel and alternatively switchable. The gate of the silicon controlled rectifier (SCR) is connected to a conductor of the dim lamp filament of the dual lamp arrangement. The SCR presents an open circuit when both of the lamps are operable but is adapted to connect the bright lamp filament through a resistor and a diode, when the dim lamp filament fails in operation.

The object of the invention is to provide greater safety in the operation of vehicles. Also an object is to automatically engage an emergency lamp circuit when a primary lamp filament fails. The objects of the invention are carried out in a simple, compact and relatively inexpensive manner compared to previous approaches to a solution to the problem.

Because of the simplicity of the circuitry involved and the relatively standard type components involved, the invention is relatively inexpensive and convenient to manufacture. This should make the advantages of this safety feature readily available on automobiles and other vehicles.

Using relatively standard parts the components and circuitry may be readily packaged in a small unitized housing. The unit is readily insertable in the circuits of previously manufactured automobiles as an add-on feature as well as being readily adaptable to use in the automobile manufacturing process. A single plug-in unit may be inserted between the head lamp and its plug without modification of existing circuitry.

DETAILED DESCRIPTION OF THE INVENTION

Figure 1:
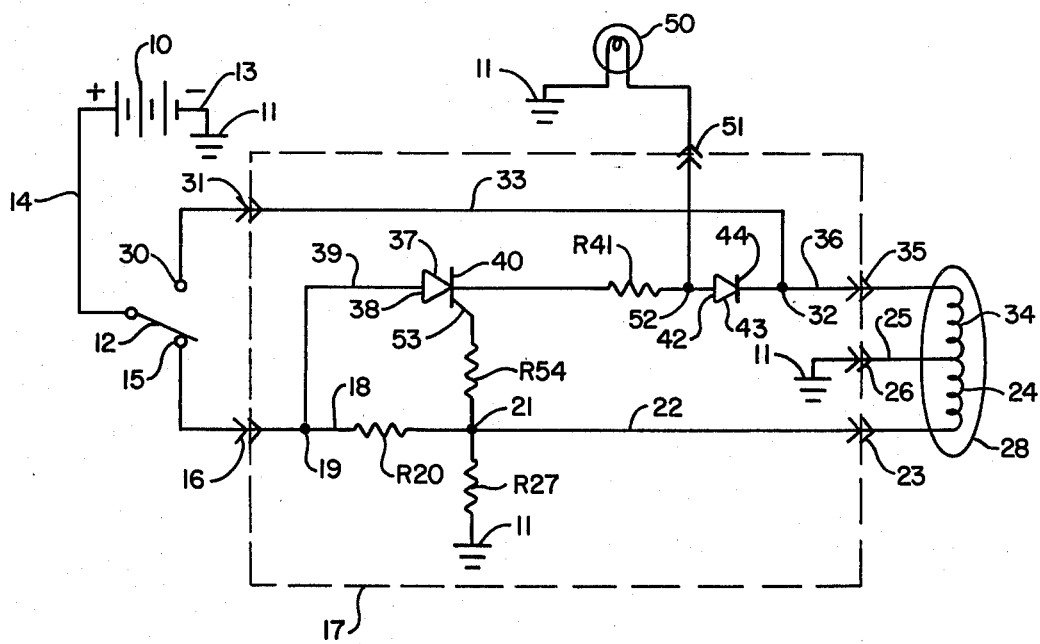
FIG. 1 is a schematic diagram of a typical circuit embodiment of this invention.

A more complete understanding of the present invention may be had from the following detailed description which should be read in conjunction with the drawings which show a preferred embodiment of the invention. Referring to FIG. 1, the control circuit of the present invention includes a source of direct current such as a battery 10 connected between ground 11 and a double throw, single pole switch 12 through conductor 13 on the negative side and conductor 14 on the positive side. One pole 15 of the switch 12 is connected through a plug 16 of the unit housing 17 (shown in Phantom Outline) to conductor 18 at a junction 19. Conductor 18 connects through resistor R20 to a junction 21 with conductor 22. Conductor 22 connects through a plug 23 to the dim lamp filament 24. The negative side of filament 24 is connected through conductor 25 to ground 11. This may be through plug 26. A balancing resistor R27 is connected between junction 21 and ground 11.

The other pole 30 of the switch 12 is connected through a plug 31 to junction 32 through conductor 33. The bright lamp filament 34 is connected through plug 35 to junction 32 by conductor 36.

A reversely polled control rectifier, typically a silicon control rectifier (SCR) 37 is connected in a subcircuit conductor 39 between conductor 22 and conductor 33. The anode 38 of the SCR 37 is connected to junction 19 by conductor 39. The cathode 40 of the SCR 37 is connected through a resistor R41 to the anode 42 of a diode 43. The cathode 44 of the diode 43 is connected to junction 32.

In the preferred embodiment shown, the filament of an indicator lamp 50 is connected on the negative side to ground 11 and on the other side through a tap 51 to a junction 52 between anode 42 and resistor 41.

The gate 53 of the SCR 37 is connected through a resistor R54 to junction 21.

The operation of the system is as follows: When the switch 12 is closed to the contact 15, dim lamp filament 24 is connected across the battery 10 and the light 28 is dimly lit. With the switch 12 in this position, the bright lamp filament 34 is not connected to the battery 10 and it remains unenergized. On the other hand, when the switch 12 is moved to pole 30, the dim lamp filament is unconnected and the bright lamp filament 34 is connected so that the light 28 burns brightly.

In the normal position the switch 12 is connected to pole 15 and the dim lamp filament is energized. Upon the failure of filament 24, with the switch 12 connected to pole 15, the circuit to gate 53 detects the difference voltage across resistor R20 through resistors R54 and R27 to ground 11. When filament 24 fails the voltage increases at junction 21 and this biases on SCR 37 by gate 53. This causes SCR 37 to conduct in the forward direction through resistor R41 and anode 42 of the diode 43. Current flows from battery ground 11 through bright lamp filament 34 and cathode 44 by conductor 36. Anode 42 is energized conducting through resistor R41 and SCR 37 to battery 10 plus.

Due to the voltage dropping resistor R41, the bright lamp filament 34 burns relatively dimly and in the properly designed circuit, it burns at approximately the same illumination as did the dim lamp filament previously.

Although not essential to the operation of the circuit as just previously described, in the preferred embodiment when the SCR 37 conducts in a forward direction, the indicator light 50 is energized from junction 52 through to ground 11.

By means of the operation just described it will be seen that when the dim light filament 24 fails the bright lamp filament 34 is energized to burn dimly and replace the other filament and at the same time the indicator light 50 is lighted, indicating to an operator that the failure and replacement has taken place.

When the safety circuit of this invention is used in an automobile, indicator lamp 50 may preferably be located on the dash board or other visible position where it may be viewed by the operator. With this safety circuit in use on the automobile it will continuously present a lighted headlight on both sides of the automobile at all times until both filaments of either headlight fail. The operator will be warned that his normal headlamp filament on one side or the other has failed.

Figure 2:
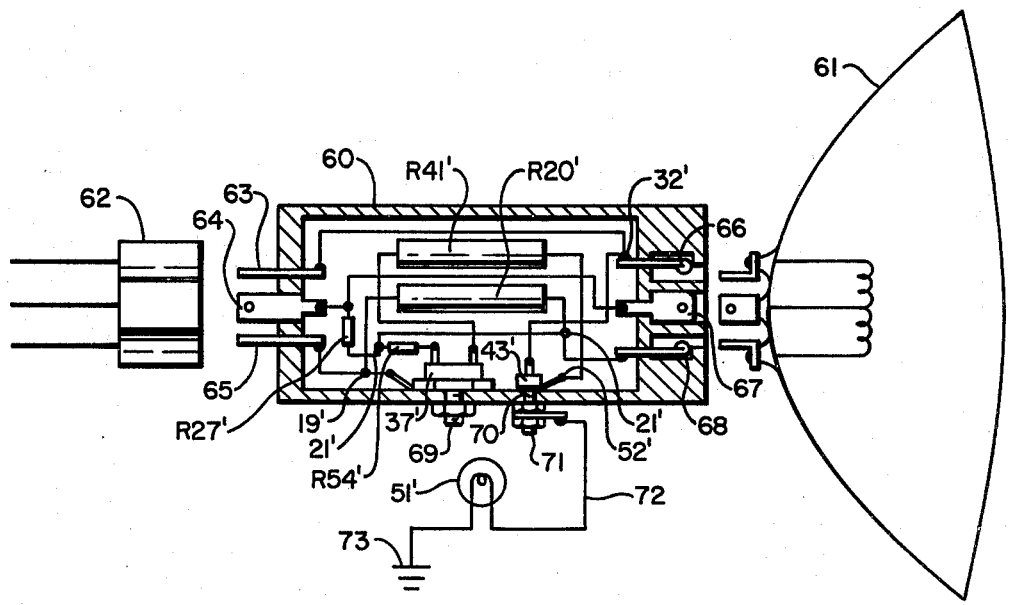
FIG. 2 is a plan view of typical unit constructed according to this invention, shown with other typical apparatus or devices that are used with the invention.

According to FIG. 2, a typical replacement unit for an automobile is shown. A housing 60, which may be molded plastic such as polystyrene or other material, is adapted to be placed between a headlight 61 and a connector plug 62. It is a common practice in the manufacture of automobiles to provide that the lamp 61 is connected to the battery and switch circuit through a plug 62. Unit 60 has three connector prongs, 63, 64 and 65 at one end, as well as three socket connector contacts 66, 67 and 68 at the other end. An SCR 37' is fastened to the unit wall by a screw or other means 69. A diode 43' connector feed-through 70 is attached to the unit 60 wall by a threaded screw 71 or other suitable means. An indicator light 51' is connected through conductor 72 to ground 73, which will normally be any point on the frame of the automobile. Within the unit housing 60 are located R20', R41', R27', R54' and R41'.

Once the unit 60 has been inserted between the headlight 61 and the plug 62 it will operate the same as previously described for the circuit shown in FIG. 1.

From the foregoing, it will be seen that this invention provides a safety circuit for automatically replacing one lamp filament with another upon the failure of the first.

Those skilled in the art will appreciate that various minor variations may be made in the electrical devices that are used in the circuit of this invention. For instance a silicon controlled switch could be used in place of the silicon controlled rectifier and under certain circumstances a light activated silicon controlled rectifier could also be used. These modifications would appear to only serve the same purposes as the SCR in the preferred embodiment.

It is herein understood that although the present invention has been specifically disclosed with the preferred embodiment and examples, modification and variation of these concepts may be resorted to by those skilled in the art. Such modifications and variations are considered to be within the scope of the invention and the appended claims.

What is claimed is:

1. A self-activating headlight safety control circuit for energizing a second headlamp filament when a first headlamp filament fails, comprising:
    (a) a source of direct current, having a positive side and a ground side;
    (b) a grounded first headlamp filament connected from the positive side of the source of direct current serially through a switch, a first junction, a first resistor, and a second junction;
    (c) a grounded second headlamp filament connected from the positive side of the source of direct current serially through the switching means to a third junction;
    (d) a silicon controlled rectifier having a cathode, an anode and a gate connection, with the anode connected to the first junction, the cathode connected serially through a second resistor and a diode to the third junction, the gate connected through a third resistor to the second junction, and with the silicon controlled rectifier unbiased to present an open circuit when the first headlamp filament is activated and biased to present a closed circuit to the second headlamp filament when the first headlamp filament fails; and
    (e) a fourth resistor connected between the second junction and the source of direct current ground.

2. A headlamp safety control circuit according to claim 1 wherein an indicator light is connected between the third junction and the source of direct current ground which is energized when the silicon controlled rectifier presents a closed circuit to the second headlamp filament.

3. A headlamp safety control circuit according to claim 1 wherein the circuit is embodied in a housing as a unit which is adapted to be inserted upon the connector prongs of a headlamp unit with a first prong connected to the first headlamp filament, a second prong connected to the second headlamp filament, and a third prong connected through the unit to the source of direct ground from the first and second headlamp filaments; and wherein the unit has fourth, fifth and sixth prongs insertable in a three-receptacle plug two receptacles of which are connected through switching means to the source of direct current and one receptacle of which is connected to the source of direct current ground.

* * * * *